United States Patent
Huang et al.

(10) Patent No.: US 6,724,891 B1
(45) Date of Patent: *Apr. 20, 2004

(54) INTEGRATED MODEM AND LINE-ISOLATION CIRCUITRY AND ASSOCIATED METHOD POWERING CALLER ID CIRCUITRY WITH POWER PROVIDED ACROSS AN ISOLATION BARRIER

(75) Inventors: Yunteng Huang, Austin, TX (US); George T. Tuttle, Austin, TX (US); Timothy J. Dupuis, Austin, TX (US); Jerrell P. Hein, Driftwood, TX (US)

(73) Assignee: Silicon Laboratories Inc., Austin, TX (US)

( * ) Notice: Subject to any disclaimer, the term of this patent is extended or adjusted under 35 U.S.C. 154(b) by 690 days.

This patent is subject to a terminal disclaimer.

(21) Appl. No.: 09/603,382

(22) Filed: Jun. 26, 2000

Related U.S. Application Data

(63) Continuation-in-part of application No. 09/034,802, filed on Mar. 4, 1998, now Pat. No. 6,298,133, and a continuation-in-part of application No. 09/480,058, filed on Jan. 10, 2000.
(60) Provisional application No. 60/145,475, filed on Jul. 23, 1999.

(51) Int. Cl.[7] .......................... H04M 1/738; H04M 19/00
(52) U.S. Cl. .................... 379/399.01; 379/412; 379/413
(58) Field of Search ........................ 379/93.01, 93.02, 379/93.03, 93.05, 93.06, 93.09, 93.36, 142, 377, 378, 379, 382, 88.19, 88.2, 88.22, 412, 399, 399.01, 399.02, 413; 375/220

(56) References Cited

U.S. PATENT DOCUMENTS

| | | | |
|---|---|---|---|
| 4,395,590 A | 7/1983 | Pierce et al. | |
| 4,417,099 A | 11/1983 | Pierce | |
| 5,003,573 A | * 3/1991 | Agah et al. | 379/27.01 |
| 5,259,003 A | 11/1993 | Berger et al. | |
| 5,280,598 A | 1/1994 | Osaki et al. | |

(List continued on next page.)

FOREIGN PATENT DOCUMENTS

| | | |
|---|---|---|
| EP | 0 881 805 A2 | 12/1998 |
| EP | 0 973 305 A1 | 1/2001 |
| JP | 11-187140 | 7/1999 |
| WO | WO98/44687 | 10/1998 |
| WO | WO 98/48541 | 10/1998 |

OTHER PUBLICATIONS

Silicon Systems, *SSI 73D2950/2950T Low Power FAX/Data Modem Chip Set Advance Information*, pp. 4–75—4–105, Dec. 1993.

(List continued on next page.)

*Primary Examiner*—Richemond Dorvil
*Assistant Examiner*—Martin Lerner
(74) *Attorney, Agent, or Firm*—O'Keefe, Egan & Peterman, LLP

(57) ABSTRACT

An improved modem architecture and associated method are disclosed that integrate modem and line-isolation circuitry so as to achieve modem functionality and system-side isolation functionality on a single integrated circuit. The combined modem and line isolation system includes a line-side line-isolation integrated circuit which contains caller ID circuitry. The caller ID circuitry includes a caller ID analog to digital converter for processing caller ID data. The caller ID analog to digital converter may be powered by a power supply generated from power provided across a capacitive isolation barrier. The caller ID circuitry may be coupled to the ringer inputs of the line-side line-isolation integrated circuit. The ringer inputs may be capacitively coupled to the phone line.

28 Claims, 6 Drawing Sheets

U.S. PATENT DOCUMENTS

| | | | |
|---|---|---|---|
| 5,369,666 A | | 11/1994 | Folwell et al. |
| 5,369,687 A | | 11/1994 | Farkas |
| 5,467,385 A | * | 11/1995 | Reuben et al. ............ 379/88.19 |
| 5,535,242 A | | 7/1996 | Brigida et al. |
| 5,602,902 A | | 2/1997 | Satterlund et al. |
| 5,654,984 A | | 8/1997 | Hershbarger et al. |
| 5,655,009 A | | 8/1997 | Arai et al. |
| 5,655,010 A | | 8/1997 | Bingel |
| 5,687,194 A | | 11/1997 | Paneth et al. |
| 5,790,656 A | * | 8/1998 | Rahamim et al. ....... 379/399.01 |
| 5,870,046 A | | 2/1999 | Scott et al. |
| 6,005,923 A | | 12/1999 | Lee |
| 6,081,586 A | | 6/2000 | Rahamim et al. |
| 6,167,121 A | | 12/2000 | Arai |
| 6,167,134 A | * | 12/2000 | Scott et al. .................. 379/413 |
| 6,169,762 B1 | | 1/2001 | Embree et al. |
| 6,198,816 B1 | * | 3/2001 | Hein et al. ............. 379/373.01 |
| 6,201,865 B1 | * | 3/2001 | Dupuis et al. ............... 379/393 |
| 6,212,272 B1 | | 4/2001 | Herschler et al. |
| 6,298,133 B1 | * | 10/2001 | Hein et al. ............. 379/399.01 |
| 6,304,597 B1 | | 10/2001 | Dupuis et al. |
| 6,323,796 B1 | * | 11/2001 | Krone et al. ................ 341/143 |
| 6,351,530 B1 | | 2/2002 | Rahamim et al. |
| 6,359,973 B1 | | 3/2002 | Rahamim et al. |
| 6,385,235 B1 | * | 5/2002 | Scott et al. .................. 375/220 |
| 6,389,063 B1 | | 5/2002 | Kanekawa et al. |
| 6,456,712 B1 | * | 9/2002 | Hein et al. ............. 379/399.01 |
| 6,498,825 B1 | * | 12/2002 | Dupuis et al. ............... 375/377 |
| 6,516,024 B1 | * | 2/2003 | Dupuis et al. ............... 375/220 |

OTHER PUBLICATIONS

Krypton, "$K^2 930G$ Functional and Electrical Descriptions", 10 pages (1997).

Information Sheet—Siemens, *DAA2000 Optical DAA Kit—Preliminary*, pp. 1–21; Jun. 13, 1997.

Siemens Press Release, *Siemens Pioneers Programmable Front End For Analog Modems Single Design For Worldwide Standards*, Aug. 6, 1997.

Information Sheet—Siemens, *ICs for Communications, ALIS Reference Board, SIPB 4595 Version 1.0, Technical Description 06.97, Q67220–H1014*, Jun. 1997.

Information Sheet—Siemens, *ICs for Communications, ALIS Evaluation Board, SIPB 45900 Version 1.1, Technical Description 06.97*, Q67220–H1047, Jun. 1997.

Data Sheet SmartMC™Modem Codec, *Host–Processed, V.90/K56flex™Modem Codec (MC) Device Set with SmartDAA™Technology for AC–link (AC'97 2.1) Applications*, Mar. 1999.

Rockwell Semiconductor Systems, *RC96V24DP, Single Device Data/Fax Modem Data Pump*, Sep. 1998.

CP Clare *CPC2400 Preliminary Specifications*, Oct. 1998.

TDK Semiconductor Corp., *73K224BL V.22bis/V.22/V.21/ Bell 212A/103 Single–Chip Modem w/Integrated Hybrid*, Nov. 1997.

Zilog *Preliminary Product Specification DS97FMO0201 Z02201 V.22bis Modem Data Pump with Integrated AFE*, 1998.

Silicon Laboratories, *Si3032 Direct Digital Access Arrangement (DDAA)*, Nov. 1997.

International Search Report dated Oct. 19, 2000.

Kojima, Y. et al., A Novel Monolithic Isolator for a Communications Network Interface IC: The $9^{th}$ Annual IEEE Int'l ASIC Conf., pp. 255–258 (1998).

* cited by examiner

US 6,724,891 B1

INTEGRATED MODEM AND LINE-ISOLATION CIRCUITRY AND ASSOCIATED METHOD POWERING CALLER ID CIRCUITRY WITH POWER PROVIDED ACROSS AN ISOLATION BARRIER

This application is a continuation in part application of U.S. patent application Ser. No. 09/034,802, filed Mar. 4, 1998, now U.S. Pat. No. 6,298,133 issued Oct. 2, 2001, and of U.S. patent application Ser. No. 09/480,058, filed Jan. 10, 2000, which in turn claims priority from Provisional Application Serial No. 60/145,475 which was filed Jul. 23, 1999, the disclosures of which are all expressly incorporated herein by reference.

TECHNICAL FIELD OF THE INVENTION

This invention relates to line isolation circuitry and modem architecture for communication lines. More particularly, this invention relates to circuitry used in connection with isolation systems for connecting to phone lines.

BACKGROUND

New generations of consumer appliances like set-top boxes, payphones, vending machines and other systems often require or prefer low-speed data modems. Such modems allow remote hosts to handle billing or other housekeeping functions, or permit "smart" vending machines to call for more supplies. Although typical microprocessor and digital-signal-processor (DSP)-based multimedia chips employed in set-top boxes and other systems are capable of implementing a low-speed modem, they would do so at an undesirable manufacturing complexity and expense.

Prior modem architectures typically included multiple integrated circuits for handling modem processing and communication line termination. In particular, one or more digital-signal-processor chips have been coupled to analog-front-end circuitry, which in turn has been connected to line termination circuitry across a transformer isolation barrier. Such modem architectures suffer from numerous disadvantages.

SUMMARY OF THE INVENTION

The present invention provides an improved modem architecture and associated method that integrate modem and line-isolation circuitry so as to achieve modem functionality and system-side isolation functionality on a single integrated circuit.

The combined modem and line isolation system also includes a line-side line-isolation integrated circuit which contains caller ID circuitry. The caller ID circuitry includes a caller ID analog to digital converter for processing caller ID data. The caller ID analog to digital converter may be powered by a power supply generated from power provided across a capacitive isolation barrier. The caller ID circuitry may be coupled to the ringer inputs of the line-side line-isolation integrated circuit. The ringer inputs may be capacitively coupled to the phone line.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1A:
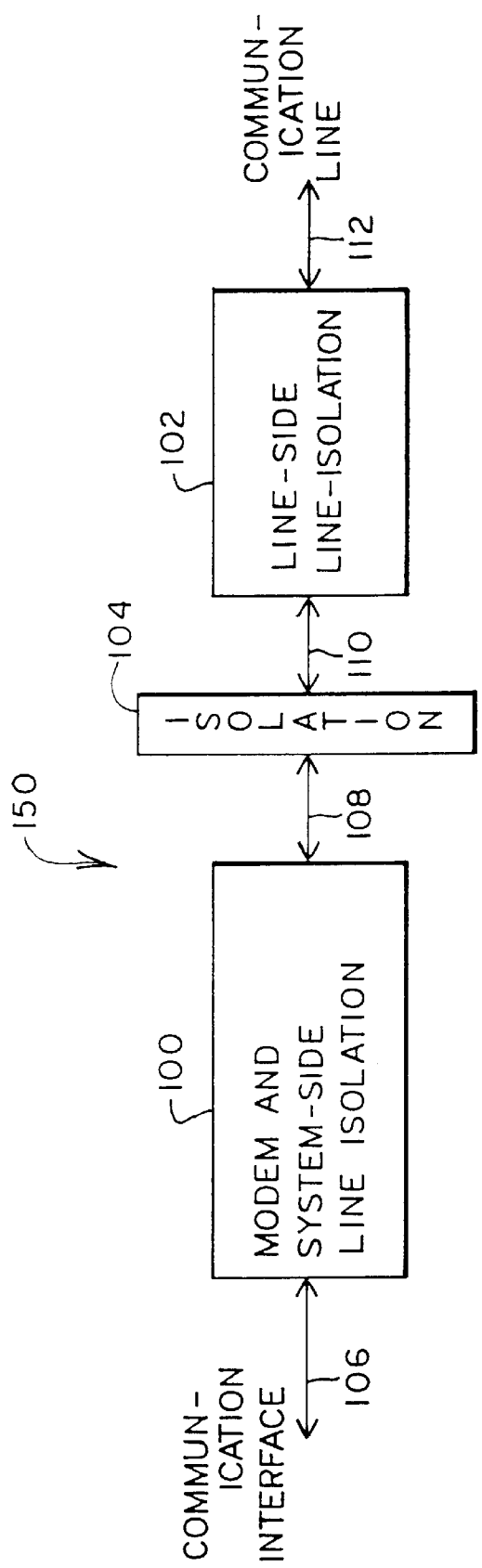
FIG. 1A is a block diagram of an embodiment for a combined modem and line-isolation system according to the present invention.

FIG. 1A is a block diagram of an embodiment for a combined modem and line-isolation system 150 according to the present invention. This combined modem and line-isolation system 150 includes a system-side line-isolation integrated circuit (IC) 100 and a line-side line-isolation integrated circuit (IC) 102. In the embodiment shown, the system-side line-isolation IC 100 includes integrated modem circuitry and circuitry providing system-side direct access arrangement (DAA) functionality. In the embodiment shown, the line-side line-isolation IC 102 includes circuitry providing line-side DAA functionality. The system-side line-isolation IC 100 communicates to external circuitry through the communication interface 106. The line-side line-isolation IC 102 communicates to the communication line through interface 112. It is noted that the communication line may be a desired medium and may be, for example, a telephone line.

The system-side line-isolation IC 100 and the line-side line-isolation IC 102 communicate digital information across an isolation barrier 104 through line interfaces 108 and 110, respectively. The isolation barrier 104 may be a capacitively isolated barrier, including one or more capacitors, and may also include a transformer or other isolation device, as desired. In addition, line-isolation systems and associated capacitively isolated barriers are disclosed in U.S. Pat. No. 5,870,046 entitled "Analog Isolation System with Digital Communication Across a Capacitive Barrier," and U.S. patent application Ser. No. 09/035,175 entitled "Direct Digital Access Arrangement Circuitry and Method for Connecting to Phone Lines," now U.S. Pat. No. 6,385,235 issued May 7, 2002, which are both hereby incorporated by reference in their entirety.

The present invention provides a single integrated circuit solution for a modem and system-side line-isolation circuitry. The modem digital-signal-processing (DSP) functionality has been combined with the system-side line-isolation DSP functionality to provide a DSP engine capable of handling, for example, both digital filter processing needed for phone line DAA functionality and modem processing needed for processing modem algorithms. This architecture achieves numerous advantages, including: (1) improved power savings by allowing the line-side line-isolation IC to be powered at least in part from the communication line, (2) improved DAA programmability by having a programmable device on the system side of the isolation barrier 104, (3) improved manufacturing and design capabilities by having a digital system-side chip 100 separate from the mixed signal line-side chip 102, and (4) improved DSP efficiency by using a single DSP engine to process both modem algorithms and required digital filters for the analog-front-end circuitry.

A wide range of interface protocols may be utilized to communicate over the external interface 106, including, for example, modem standards, such as V.22 bis (QAM), V.22/Bell 212A 1200 bit/s (DPSK), V.21/Bell 103 300 bit/s (FSK), V.23/Bell 1200 bit/s V.23 with data flow reversing, and V.25-based fast connect. In addition, the modem interface 106 can handle the Security Industry Association's generic digital communication standard, as well as other alarm protocols. The interface 106 may also be, for example, an asynchronous serial interface. If desired, the interface 106 may also be designed as a synchronous serial interface, an asynchronous parallel interface, a synchronous parallel interface, or any other desired interface.

Figure 1B:
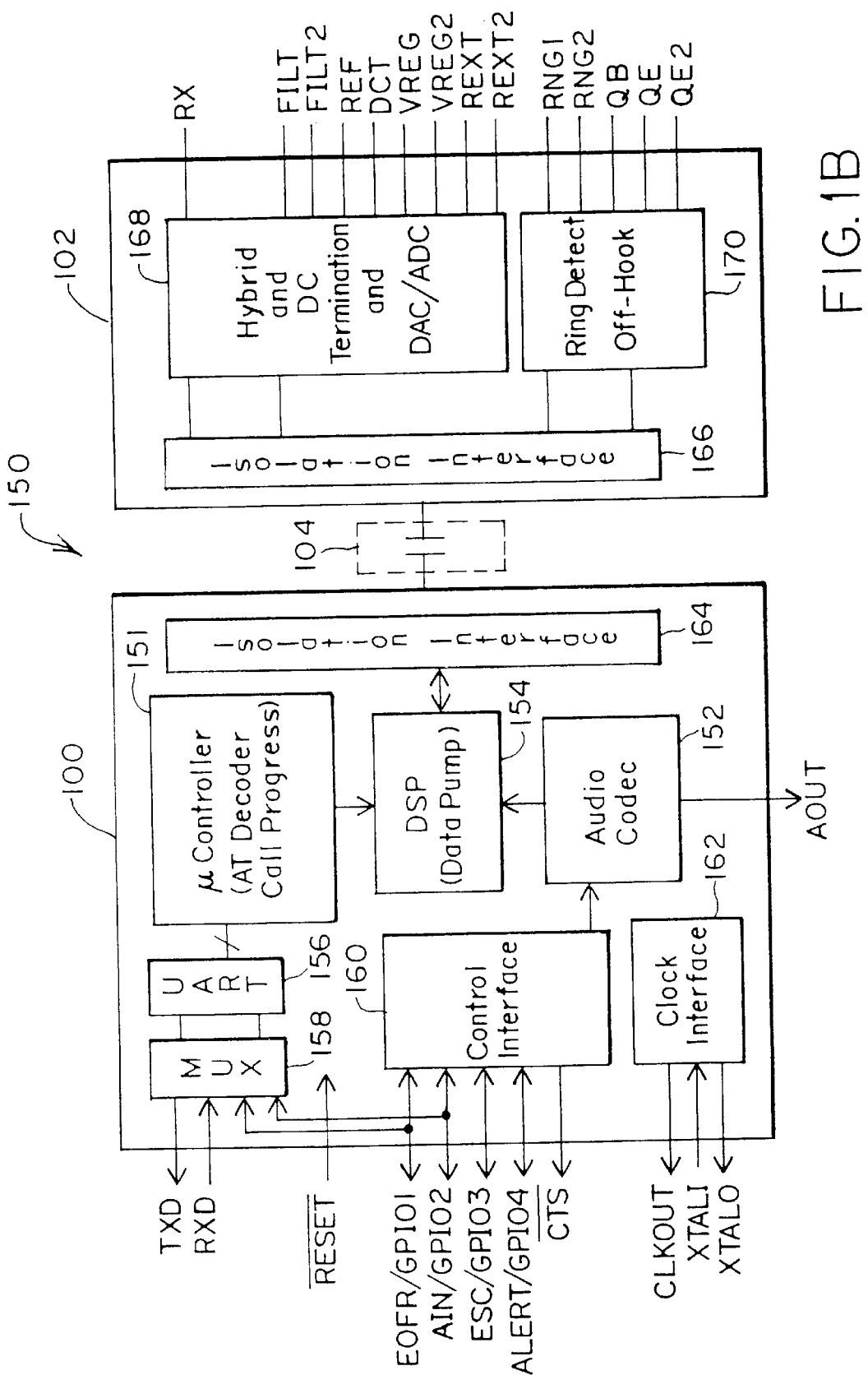
FIG. 1B is a more detailed block diagram of an embodiment, including an example pin-out configuration, for the combined modem and line-isolation system according to the present invention.

FIG. 1B is a more detailed block diagram of an embodiment for combined modem and line isolation system 150 according to the present invention. The isolation barrier 104 is a capacitively isolated barrier that is connected between external pins of the system-side line-isolation IC 100 and the line-side line-isolation IC 102.

The system-side line-isolation IC 100 includes an isolation interface 164; a digital-signal-processor (DSP) 154, a microcontroller 151, an audio CODEC (COder-DECoder) 152, a clock interface 162, a control interface 160, a UART (Universal Asynchronous Receiver Transmitter) processor 156, and a multiplexer (MUX) 158. The UART processor 156 operates to convert parallel bytes from the microcontroller 151 into serial bits for transmission to and receipt from an external device through the transmit pin TXD and receive pin RXD, respectively. For example, the UART may operate in an 8-bit word format or a 9-bit word format for serial data transmission through the transmit pin TXD and/or the receive pin RXD.

The DSP 154 provides data pump functionality and may be, for example, a 14-bit DSP that performs data pump functions. The microcontroller 151 provides AT command decoding and call progress monitoring and may employ, for example, a 4-bit program word and an 8-bit data word. The clock interface 162 includes a clock generator that accepts a high-frequency (e.g., 4.9152-MHz) master clock input. It also generates all the modem sample rates for supporting the modem standards designed into the system-side line-isolation IC. In addition, the generator provides a 9.6 kHz rate for audio playback.

Pins for the system-side line-isolation IC 100 may include the transmit pin TXD, the receive pin RXD, the reset pin RESET_, the clear-to-send pin CTS_, the clock output pin CLKOUT, crystal oscillator pins XTALI and XTALO, and the analog output pin AOUT. Four other pins may be general purpose programmable input/output pins GPIO1, GPIO2, GPIO3, and GPIO4. Each of these pins may be set up as analog in, digital in, or digital out pins, depending upon user programming of pin functionality. In particular, the GPIO1 pin may also function as the end of frame pin EOFR for HDLC framing. The GPIO2 pin may provide an analog in pin AIN. The GPIO3 pin may function as an escape pin ESC for controlling command or data modes. And the GPIO4 pin may function as the alert pin ALERT for signaling events such as an intrusion event. Programming and control of the system-side line-isolation IC 100 may be accomplished by sending appropriate commands through the serial interface. For example, commands may be sent by an external integrated circuit that load internal registers within the system-side line-isolation IC 100 that control the operation and functionality of the system-side line-isolation IC 100.

Line-side line-isolation IC 102 includes an isolation interface 166, ring detect and off-hook circuitry 170, and circuitry 168 that includes hybrid and DC termination circuitry as well as analog-to-digital converter (ADC) and digital-to-analog converter (DAC) circuitry. Pins for the line-side line-isolation IC may include a receive input pin RX, filter pins FILT and FILT2 that may set the time constant for the DC termination circuit, a reference pin REF that may connect to an external resistor to provide a high accuracy reference current, a DC termination pin DCT that may provide DC termination for the phone line and an input for voltage monitors, voltage regulation pins VREG and VREG2 that may connect to external capacitors and provide a bypass for an internal power supply, external resistor pins REXT and REXT2 that may provide real and complex AC termination, ring pins RNG1 and RNG2 that may connect through capacitors to "tip" and "ring" to provide ring and caller ID signals across the barrier 104, and transistor connection pins QB, QE and QE2 that may connect to external bipolar hook-switch transistors.

Figure 2:
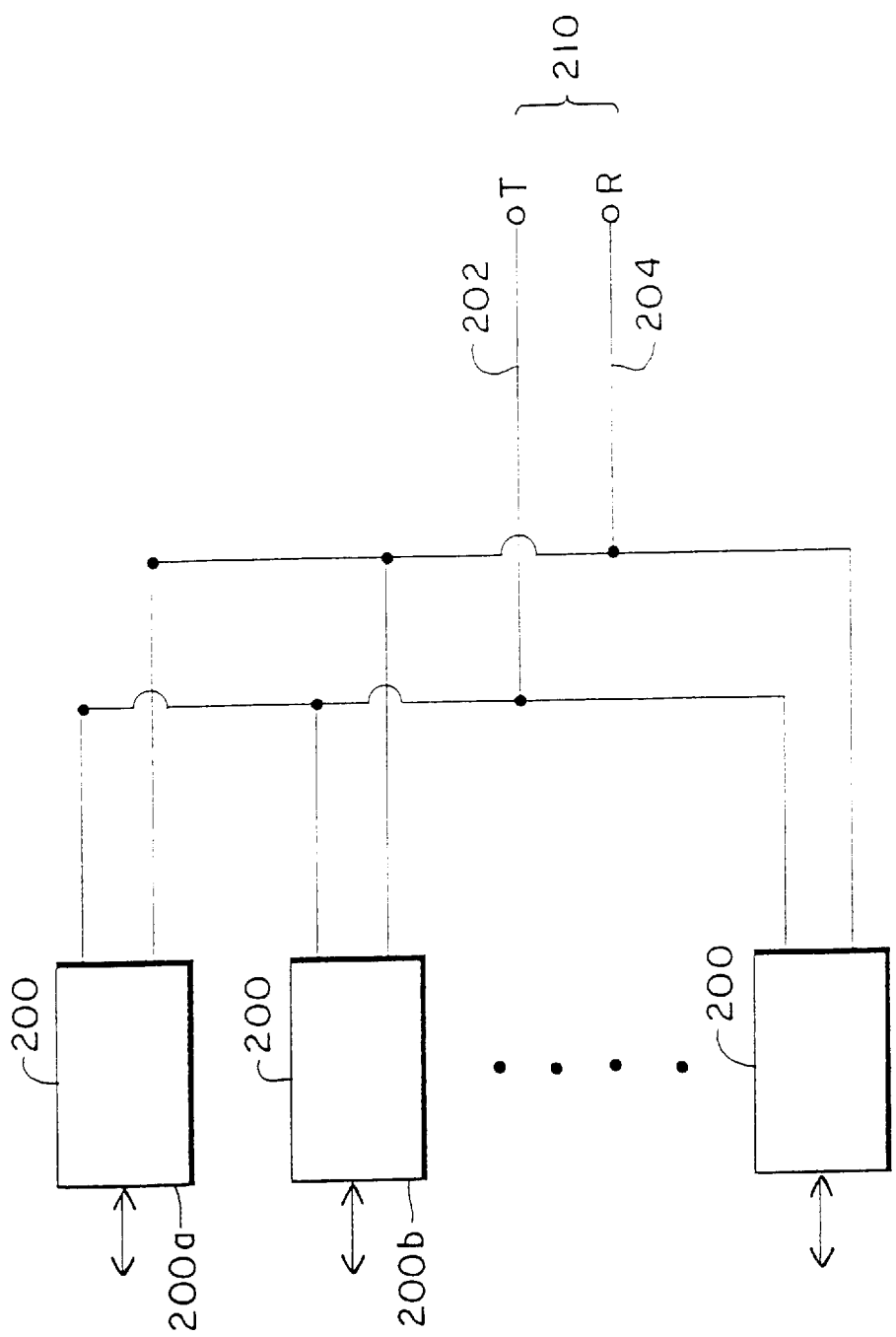
FIG. 2 is a block diagram of multiple phone line connection devices coupled to a phone line.

In some applications, multiple modems or other phone line connection devices may be coupled to a single phone line. For example, as shown in FIG. 2 a plurality of phone line connection devices 200 may be coupled to the TIP line 202 and the RING line 204 of a single two-wire phone line 210 so as to share the phone line. Such phone line connection devices 200 may be considered to be coupled in parallel to the phone line. Each phone line connection device 200 may be a combined modem and line-isolation system 150, other circuitry that includes a direct access arrangement (DAA), a stand alone direct access arrangement, a standard telephone, or any other device that may be coupled to the phone lines to transmit information to and from the phone line. Though a plurality of phone line connection devices 200 are connected to the phone line 210, for most applications only a single phone line connection device 200 will be in an off-hook state (the state in which information may be communicated to and from the phone line) at any given time. Thus, generally only one phone line connection device 200 will have "seized" the phone line.

In applications such as shown in FIG. 2, it may be desirable for one or more of the parallel connected phone line connection devices 200 to detect the status of the other parallel connected phone line connection devices. The detection of the status of other phone line connection devices may be desirable to (1) allow one phone line connection device 200 to detect if another phone line detection device is already in an off-hook state (and thus seized the phone line), or (2) to allow one phone line connection device to determine if another phone line connection device is trying to seize the line. The functionality of item (1) above may be called on-hook intrusion detection (i.e., the phone line connection device that is on-hook will detect if other phone line connection devices are already off-hook to prevent an intrusion into the other off-hook communications). The functionality of item (2) above may be called off-hook intrusion detection (i.e., the phone line connection device that is off-hook will detect if other on-hook phone line connection devices are attempting to intrude into the off-hook communication).

For example as shown in FIG. 2, phone line connection device 200a may already be in an off-hook state while phone line connection-device 200b is in an on-hook state. Then prior to phone line connection device 200b attempting to transition into the off-hook state, the phone line connection device 200b will perform an intrusion detection function to detect whether any of the other phone line connection devices 200 are already in the off-hook state. When phone line connection device 200b detects that phone line connection device 200a is already off-hook, then phone line connection device 200b will not enter the off-hook state. In this manner, phone line connection devices 200a and 200b may be prevented from attempting to communicate across the phone line at the same time through the use of the on-hook intrusion detection functionality of phone line connection device 200b.

In another example, phone line connection device 200b may be in an off-hook state and phone line connection device 200a may be in the on-hook state. Further, phone line connection device 200b may have phone line detection functionality to detect if another of the phone line connection devices are attempting to go into the off-hook state. Thus, if phone line connection device 200a attempts to go off-hook, phone line connection device 200b will detect this event. Priorities may be established between the phone line connection devices such that phone line connection device 200b may surrender the phone line to phone line connection device 200a when phone line connection device 200b detects that the other phone line connection device is attempting to go off-hook. In this manner, off-hook intrusion detection functionality of phone line connection device 200b may be utilized to allow phone line connection device 200a to be prioritized over phone line connection device 200b.

In order to accomplish the parallel phone line intrusion detection functionality described above, the phone line connection device 200b may monitor the level of various electrical signals that indicate the status of the other phone line connection devices. These indicator levels may include the DC line voltage of the phone line 210 and/or the DC loop current drawn from the phone line 210 by the phone line connection device 200b. More particularly, the DC line voltage level may be an indicator of whether other phone line connection devices are off-hook when the phone line connection device 200b is on-hook and the DC loop current drawn by the phone line connection device 200b may be an indicator of whether other phone line connection devices are attempting to go off-hook when the phone line connection device 200b is already off-hook.

Although the off-hook and on-hook intrusion detection has been described herein with reference to one of the phone line connection devices, it will be recognized that some or all of the phone line connection devices 200 of FIG. 2 may utilized off-hook detection, on-hook detection, or both.

During on-hook intrusion detection, the phone line connection device (such as phone line connection device 200b) having parallel phone line detection functionality may monitor the phone line voltage when the phone line connection device 200b is on-hook. When a phone line is not seized by any other phone line connection device (i.e. all the devices are in an on-hook state), the DC voltage on the line will generally be within a known range. For example, although the DC voltage may vary depending upon various country standards and line conditions a typical phone line condition when a line is not seized may be 48–70 volts. However, if another phone line connection device is off-hook then the DC line voltage seen by the phone line connection device 200b will drop. A drop in the DC line voltage may thus be utilized as part of the on-hook intrusion detection to establish if another phone line connection device is already off-hook.

The drop in the DC phone line voltage that is utilized as part of the on-hook intrusion detection may be either an absolute drop or differential drop. In a typical example such as the 48–70 volt phone line conditions mentioned above, an absolute limit of 28 volts may be utilized to establish whether another phone line connection device is off-hook. If the phone line connection device 200b detects a DC phone line voltage above 28 volts, the phone line is considered available for use and the phone line connection device 200b may go off-hook. However, if the phone line connection device 200b detects a DC phone line voltage below 28 volts, the phone line is considered unavailable for use as another phone line connection device is off-hook and the phone line connection device 200b will thus remain on-hook.

For certain line conditions, phone line connection device characteristics and country standards for line voltages, the DC phone line voltage may be 40 volts or higher even when a phone line connection device is off-hook and has seized the line. For example, countries with current limiting specifications such as France may have unusually high off-hook DC line voltages and the minimum on-hook voltages may not be much higher. In such circumstances, a differential drop in the DC line voltage may be a more desirable monitoring technique to detect whether another parallel phone line connection device is already off-hook. When utilizing a differential drop technique, a change in the phone line DC voltage may be seen when another parallel phone line connection device is off-hook. For example, phone line connection device 200b may monitor the DC phone line voltage on a regular basis (in one embodiment every 27 msec). A baseline DC phone line voltage may be established by the phone line connection device 200b when all phone line connection devices are on-hook. The phone line connection device 200b then regularly monitors the DC phone line voltage thereafter. When a drop in the phone line voltage from the previous phone line voltage measurement (i.e. the differential drop) is detected, another phone line connection device is determined to be off-hook. In one embodiment the differential drop utilized to detect the off-hook status of another phone line detection device may be 4.5 V. If the differential drop is less than 4.5 V, the phone line is considered available for use by phone line connection device 200b. However, if a differential drop of more than 4.5 V is detected, then the on-hook intrusion detection indicates that the phone line connection device 200b should not attempt to go off-hook. When the differential voltage between two measurements indicates that the DC phone line voltage has risen by more than 4.5 V, the off-hook state of the other phone line connection device is determined to have ended.

During off-hook intrusion detection, the phone line connection device (such as phone line connection device 200b) having parallel phone line detection functionality may monitor the DC loop current through the phone line connection device 200b when the phone line connection device 200b is off-hook. When a phone line connection device such as device 200b is off-hook, a DC loop current will be drawn through the phone line connection device 200b. For example, although the DC loop current may vary depending upon the phone line connection device, various country standards, and line conditions, a typical DC loop current drawn by an off-hook phone line connection device may be 20–100 mA. However, if another phone line connection device attempts to go off-hook then the DC loop current seen by the phone line connection device 200b (the device already off-hook) will drop. A drop in the DC loop current may thus be utilized as part of the off-hook intrusion detection to establish if another phone line connection device is attempting to go off-hook.

The drop in the DC loop current that is utilized as part of the off-hook intrusion detection may be either an absolute drop or differential drop. In a typical example such as the 20–100 mA conditions mentioned above, an absolute limit may not be as useful as a differential limit due to the wide range of loop currents that may exist in normal off-hook operation. When utilizing a differential drop technique, a change in the DC loop current through the phone line connection device 200b may be seen when another parallel phone line connection device is attempting to go off-hook. For example, phone line connection device 200b may monitor the DC loop current on a regular basis (in one embodiment every 400 msec). A baseline DC loop current may be established by the phone line connection device 200b when the phone line connection device 200b is off-hook and all the other phone line connection devices are on-hook. The phone line connection device 200b then regularly monitors the DC loop current thereafter. When a drop in the DC loop current from the previous DC loop current measurement (i.e. the differential drop) is detected, another phone line connection device is determined to be attempting to go off-hook. In one embodiment the differential drop utilized to detect the off-hook status of another phone line detection device may be 6 mA. If the differential drop is less than 6 mA, other phone line connection devices are not attempting to seize the phone. However, if a differential drop of more than 6 mA is detected, then the off-hook intrusion detection indicates to phone line connection device 200b that other phone line connection devices are attempting to go off-hook. When the differential voltage between two measurements indicates that the DC loop current has risen by more than 6 mA, the off-hook attempts of the other phone line connection device are determined to have ended.

In an absolute limit mode, a preset DC loop current limit utilized to detect another parallel phone line connection device attempting to go off-hook may not be advantageous because loop current values may very so much. A more advantageous use of an absolute DC loop current detection trigger level is to establish the typical loop current and an absolute limit based upon the established level. Then an off-hook intrusion event is indicated when the loop current drops below the determined absolute limit. In such a mode of operation, the phone line if connection device 200b may go off-hook for a short period of time (when all other devices are on-hook) to establish the actual off-hook DC loop current level through the phone line connection device 200b. The absolute limit may then be set at the measured level or some amount below the that level. In order to account for line resistance drift, the actual off-hook DC loop current may be periodically sampled.

Thus as described above, an absolute indicator level or a differential indicator level may be used for on-hook intrusion detection. In the example provided herein, the indicator level utilized for on-hook intrusion is a phone line voltage level. Likewise an absolute indicator level or a differential indicator level may be used for off-hook intrusion detection. In the example provided herein, the indicator level utilized for off-hook intrusion is a DC loop current level through the phone line connection device. The concepts of the inventions described herein may be utilized together or separately. Thus, a phone line connection device may be configured to have on-hook intrusion detection, off-hook intrusion detection or both. The intrusion detection may be absolute or differential detection. In addition, the phone line connection device may be programmable so that a user may select any one or more of the various intrusion detection techniques described herein. A user may, therefore, program the system to utilize absolute or differential techniques and the programmability of the off-hook intrusion and the on-hook intrusion algorithms may be independent of each other.

It will be recognized that the various absolute and differential voltage and current levels described herein are provided as merely exemplary embodiments and other levels may be utilized. Further, rather than requiring preset absolute or differential voltage and current levels, the voltage and current levels utilized in the various intrusion detection modes of operation may be user programmable. For example, programmable data registers may be provided in the phone line connection device 200b. These data registers may allow the user to select the absolute voltage level for on-hook intrusion detection, the differential voltage level for on-hook intrusion detection, the absolute current level for off-hook intrusion detection, and/or the differential current level for off-hook intrusion detection.

The phone line connection device 200b described above which has on-hook and off-hook intrusion detection techniques may be a combined modem and line-isolation system such as the combined modem and line-isolation system 150 of FIGS. 1A and 1B. In one embodiment, the line-side line-isolation IC 102 may include a voltage detector for detecting the phone line voltage for on-hook intrusion detection and a current detector for detecting the DC loop current for off-hook intrusion detection. The detected voltage and current levels may then be transmitted to the system-side line-isolation IC 100 through the isolation barrier 104. The system-side line isolation IC 100 may contain data registers which store the detected voltage and current levels. The detected levels contained in these registers may then be compared to either the absolute or differential levels (which may be stored in programmable data registers) for the appropriate intrusion detection technique. As mentioned above, which intrusion detection techniques are utilized may be programmably selected by a user and the data registers containing the absolute or differential levels for the appropriate intrusion detection technique may also be programmable set by the user. When an intrusion event (either on-hook or off-hook is detected) an intrusion event signal may be provided by the system-side line-isolation IC 100 to the communication interface 106. For example, a high signal on the ALERT/GPIO4 pin of the system-side line isolation integrated circuit 100 may indicate an intrusion event. External circuitry may also read the various intrusion detection data registers within the system-side line isolation IC 100 through the communication interface 106 in order to utilize a user's custom intrusion detection algorithm.

In an alternative embodiment, the intrusion detection may be performed entirely within the line-side line-isolation IC 102. In such an embodiment, only the intrusion event signal need by transmitted across the isolation barrier 104 rather than the detected voltage and current levels.

Figure 3:
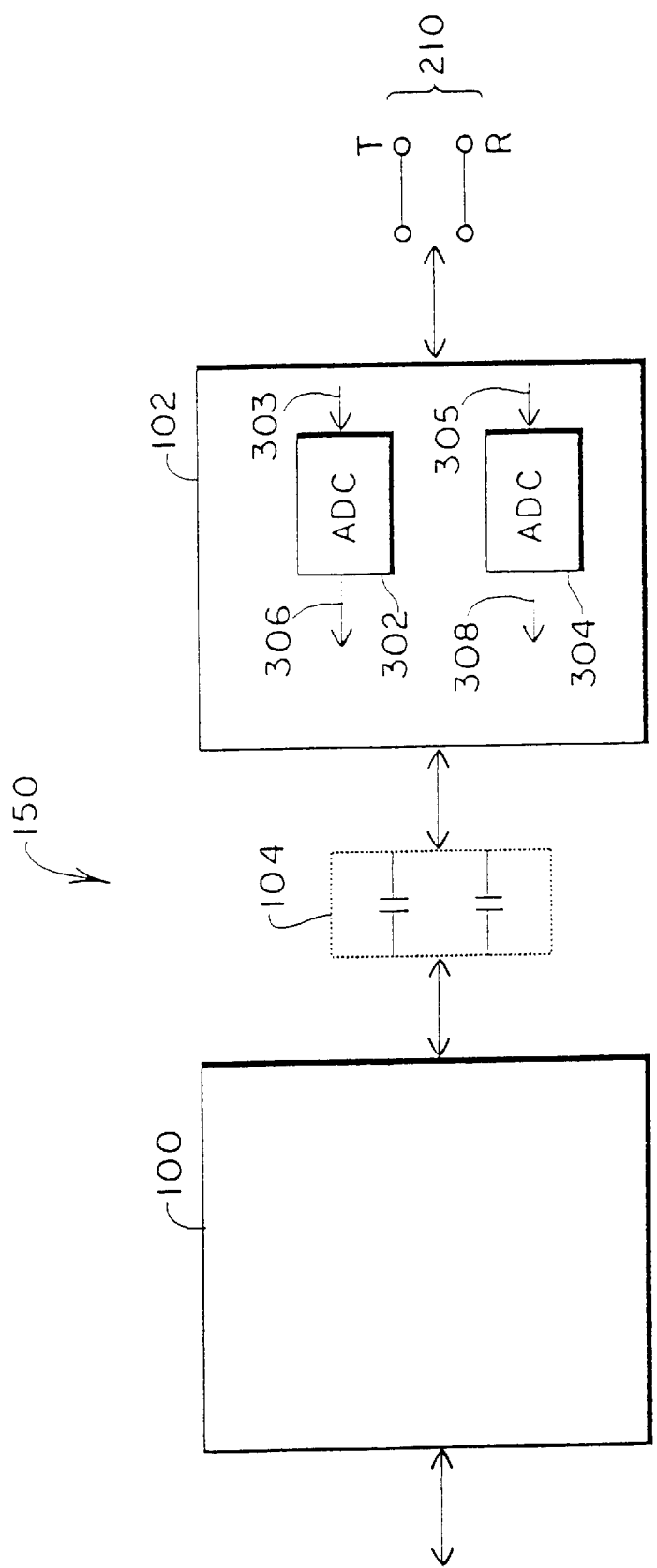
FIG. 3 is a block diagram of a combined modem and line isolation system having intrusion detection analog to digital converters.

The voltage level and current level detection necessary for determining an on-hook and off-hook intrusion does not have to be highly accurate. For example as shown in FIG. 3, a line voltage analog to digital converter (ADC) 302 within the line-side line-isolation IC 102 may be coupled to the phone line 210 to perform a coarse analog to digital conversion of a phone line voltage level input 303 to provide a digital output 306. The ADC 303 may be a five bit ADC having a bit accuracy of 2.25 V. A loop current analog to digital converter (ADC) 304 within the line-side line-isolation IC 102 may be coupled to the loop current path to perform a coarse analog to digital conversion of a DC loop current input 305 within the line-side line-isolation IC 102 to provide a digital output 308. The line voltage ADC may be a five bit ADC having a bit accuracy of 2.25 V and the DC loop current ADC may be a separate five bit ADC having a bit accuracy of 3 mA.

The low accuracy ADCs 302 and 304 may run off a DC power supply generated from power transmitted across a capacitive isolation barrier or from a DC power supply generated from power obtained from the phone line. The power supplied to each ADC need not be obtained from the same source, and thus, the line voltage ADC may be powered from power generated across the isolation barrier while the loop current ADC may be powered from power drawn from the phone line. The digital outputs 306 and 308 of the five bit ADCs may then be provided within the control signals sent across the isolation barrier 104 to the data registers of the system-side line isolation IC 100. Because of the amount of change in the phone line voltage level and loop current level when an intrusion occurs, more accurate ADCs are not necessary. However, more or less accurate ADCs may be utilized and the benefits of the present disclosure may still be obtained.

The ADCs utilized to monitor the phone line voltage and DC loop currents may be coupled to the phone line through the DC holding circuitry and hookswitch circuitry that may be internal and external to the line-side line-isolation IC 102. The hookswitch circuitry generally includes external transistors utilized to establish the off-hook and on-hook states. The DC holding circuitry generally includes circuitry to achieve the proper DC termination characteristics since various telephone interface standards generally include specifications for DC termination of the telephone line. For example, the DC impedance that the DAA circuitry presents to the telephone line (typically $\leq 300\Omega$) may be required by regulations to be less than the AC impedance that the DAA circuitry presents to the telephone line (typically $\approx 600\Omega$). Consequently, inductive behavior is required from the section of the DAA circuitry that sinks DC loop current, which is typically called the DC termination or DC holding circuitry. This inductive behavior of the DC holding circuitry should provide both high impedance and low distortion for voiceband signals. The DC termination specifications may also include limits for the maximum current and power dissipation. The DCT pin of the line-side line-isolation IC 102 may be utilized to provide both the proper DC termination characteristics and, as discussed in more detail below, an input for the phone line voltage monitoring utilized during on-hook intrusion detection. The line-side line-isolation IC 102 may be programmable to meet various international DC termination standards as shown in co-pending U.S. patent application Ser. No. 09/097,621, filed Jun. 16, 1998, now U.S. Pat. No. 6,201,865 issued Mar. 13, 2002, the disclosure of which is incorporated by reference herein. The DC termination characteristics may also be implemented in a manner that allows the loop current to be monitored by an ADC and that minimizes the power dissipated in the DC holding circuitry by using an external resistor such as shown in co-pending U.S. patent application Ser. No. 09/034,683, filed Mar. 4, 1998, now U.S. Pat. No. 6,167,134 issued Dec. 26, 2000, the disclosure of which is incorporated by reference herein.

Figure 4:
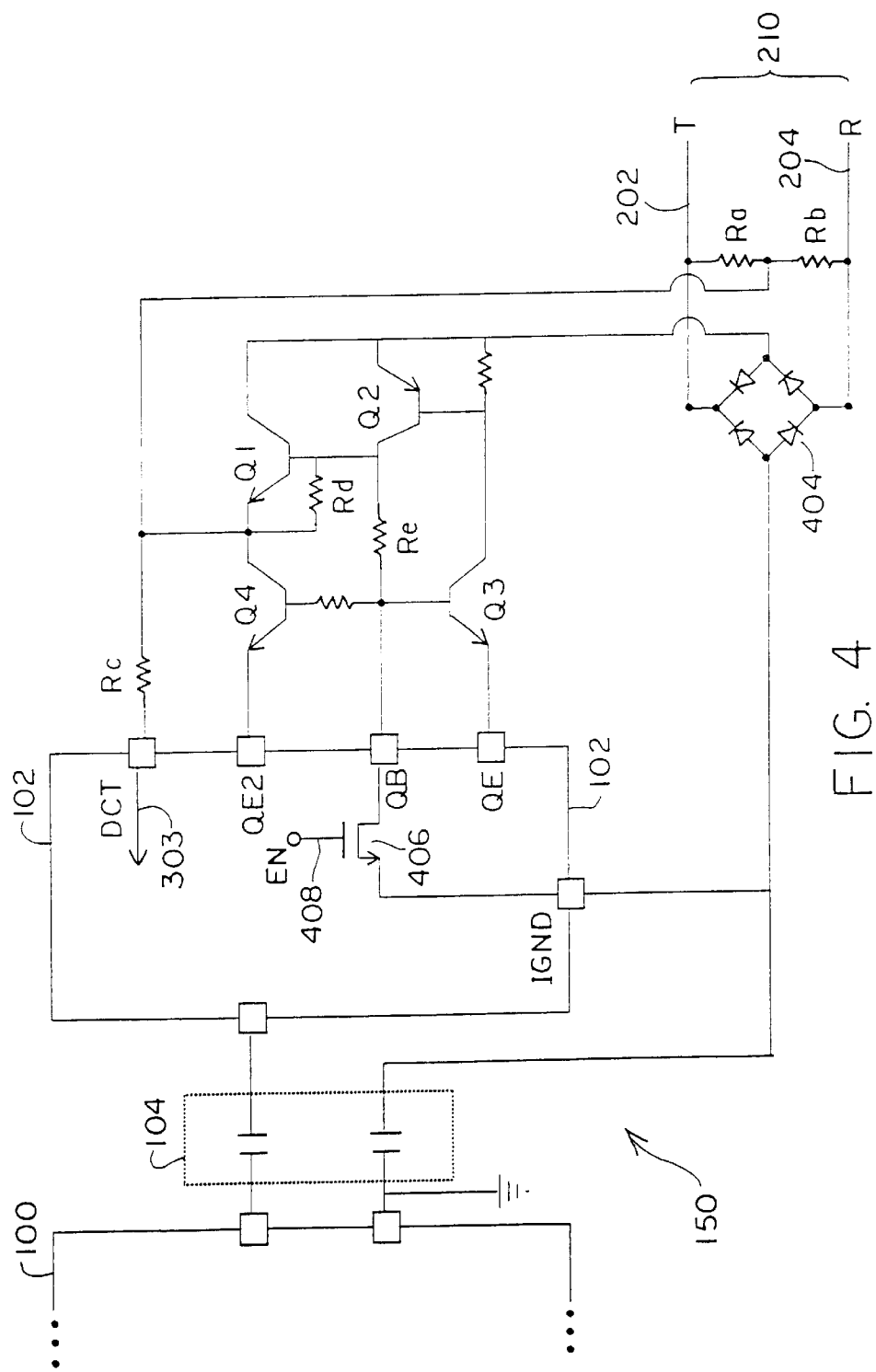
FIG. 4 is a diagram of a combined modem and line isolation system having intrusion detection voltage monitoring through a DC termination pin.

FIG. 4 illustrates how the phone line voltage level input 303 of the analog to digital converter (ADC) 302 within the line-side line-isolation IC 102 may be coupled to the phone line 210 through the DCT pin of the line-side line-isolation IC 102. For illustrative purposes, FIG. 4 illustrates only the DCT, QE2, QB, QE, and IGND pins of the line-side line-isolation IC 102, however, the other pins as described above may also be present. As shown in FIG. 4, the TIP and RING lines 202 and 204 of the two wire public phone line 210 are conventionally coupled to a diode bridge 404. The diode bridge presents the proper polarity line signal to the hookswitch circuit transistors Q1, Q2, Q3 and Q4 independent of the TIP and RING polarity. The hookswitch circuit transistors operate to switch the system between off-hook and on-hook states in response to the line-side line-isolation IC 102. In standard operation, the DCT pin may typically only be utilized in off-hook modes to help set the DC termination characteristics. However, as shown in FIG. 4 the DCT pin may also provide the phone line voltage level input 303 during on-hook states so as to allow the phone line voltage to be monitored to establish on-hook intrusion detection. More particularly, the DCT pin may be utilized to monitor the phone line voltage (Vt-r) through the use of shorting transistor 406. When the phone line voltage is to be monitored for on-hook intrusion detection, the enable (EN) signal 408 switches such that transistor 406 shorts the QB pin to the IGND pin (the enable signal is off at other times). If the resistors Ra, Rb, Rc, Rd, and Re have resistance values of 10 M$\Omega$, 10 M$\Omega$, 1.6 k$\Omega$, 100 k$\Omega$, and 1.6 k$\Omega$ respectively, it can be shown that when transistor 406 is shorted, the resistor network will provide approximately 0.01 Vt-r at the DCT pin. The ADC input 303 may then provide this voltage to a line voltage monitor ADC for determining if an on-hook intrusion has occurred as described above. The line voltage may be monitored through the DCT pin because this pin is typically not utilized during on-hook operations. However, additional integrated circuit input pins may be provided for the purpose of monitoring the line voltage. In such cases the additional pins may be coupled to the phone line through a network of resistors including Rb and Rc (similar to FIG. 4) and at least one lower resistance additional resistor (for example 100 k$\Omega$) in order to attenuate the line voltage. The additional pins may also be coupled to the line voltage monitor ADC through the phone line voltage level input 303. In either case (DCT pin or additional pins), the high line voltages may be reduced by an attenuation network to provide voltages within the normal range of integrated circuit operations.

Figure 5:
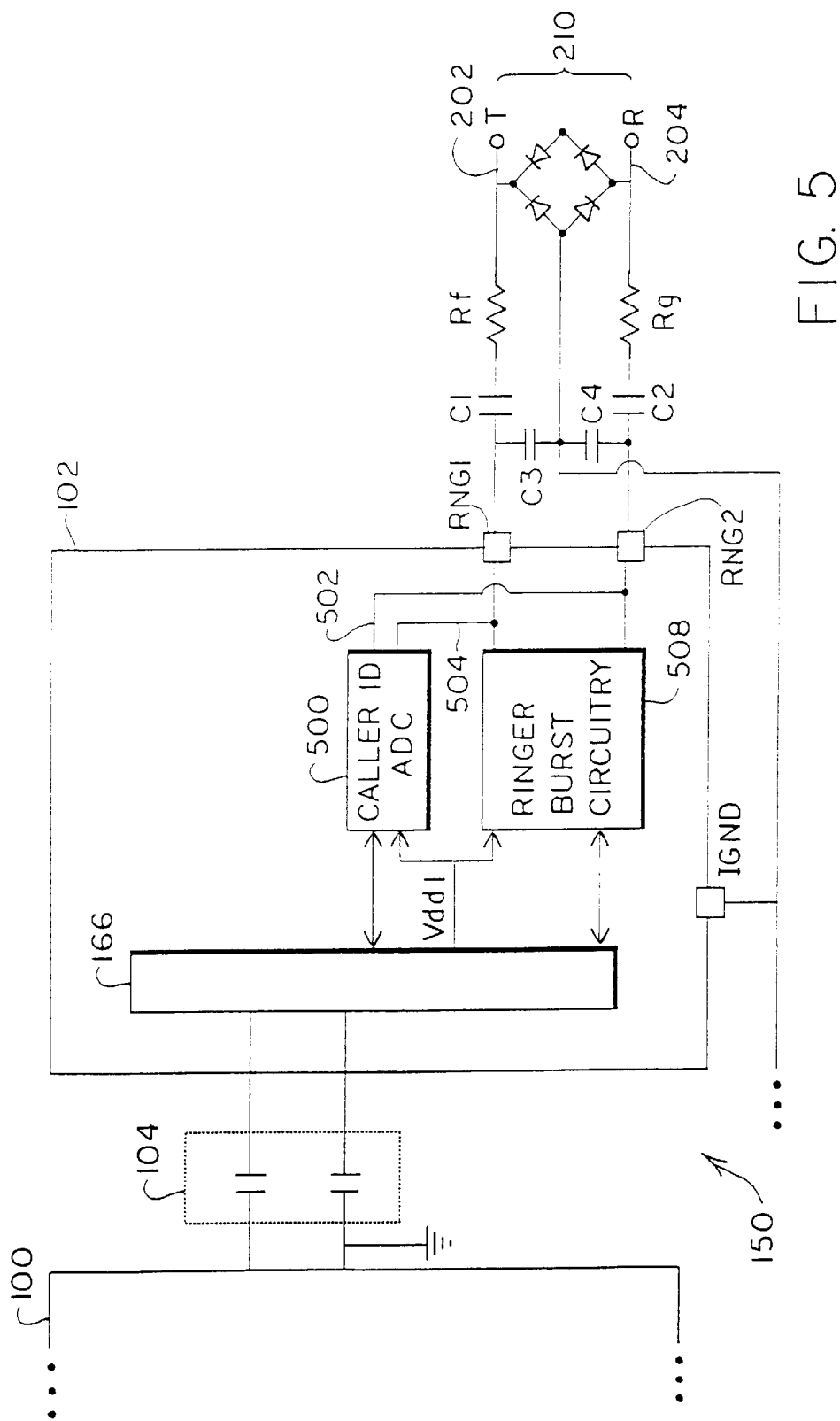
FIG. 5 is a block diagram of a combined modem and line isolation system having caller ID circuitry coupled to ringer inputs and powered from power provided across an isolation barrier.

As described above, the line voltage ADC may be powered from power generated across the capacitive isolation barrier 104. Other ADCs may also be powered from power generated from across the capacitive isolation barrier. For example, as shown in FIG. 5 the isolation interface 166 may generate a power supply Vdd1 from signals provided across the isolation barrier 104 as described in more detail in the above referenced U.S. Pat. No. 5,870,046. The power supply Vdd1 may be provided to the line voltage ADC as discussed above. Further as shown in FIG. 5, Vdd1 may also be utilized to power a low power (generally drawing less than 20 uA) caller ID ADC 500 within the line-side line-isolation IC 102 and to power the ringer burst circuitry 504. The caller ID ADC may be a low power delta sigma ADC or another type of other low power ADC. In this manner the caller ID ADC may be operated while drawing substantially no loop current from the phone line.

As shown in FIG. 5, the caller ID ADC inputs 502 and 504 may be coupled to the ringer input pins RNG1 and RNG2 of the line-side line-isolation IC 102. The ringer input pins RNG1 and RNG2 may also be coupled to ringer burst circuitry 508 which detects ringing events. Moreover, as also shown in the figure, the ringer inputs may be capacitively coupled to the TIP line 202 and RING line 204 of the phone line 210. The capacitive coupling of the ringer inputs may be accomplished with capacitors C1, C2, C3 and C4 having capacitances of 1800 pF, 1800 pF, 12 nF, and 12 nF respectively. The use of ringer inputs for transmitting caller ID data and capacitively coupled ringer inputs is further described in co-pending U.S. patent application Ser. No.

09/034,802, filed Mar. 4, 1998, the disclosure of which is incorporated herein by reference. Alternatively, the ringer inputs may be coupled to the phone line through a resistive network.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention.

We claim:

1. A combined modem and line-isolation system, comprising:
    a line-side line-isolation integrated circuit;
    a system-side line-isolation integrated circuit;
    digital signal processing (DSP) circuitry included within the system-side line-isolation integrated circuit, the DSP circuitry having a modem processor for modem data and a digital processor for system-side circuitry; and
    caller ID circuitry integrated within the line-side line isolation integrated circuit, the caller ID circuitry being powered with a power supply derived from power transmitted across an isolation barrier between the line-side line isolation integrated circuit and a system-side line-isolation integrated circuit, and the caller ID circuitry comprising analog-to-digital converter circuitry configured to output digital data representative of caller ID information;
    wherein the line-side line-isolation integrated circuit and the system-side line-isolation integrated circuit are capable of being coupled to the isolation barrier to communicate digital information with each other through the isolation barrier, the digital information from the line-side line-isolation integrated circuit being configured to include the digital data representative of caller ID information.

2. The system of claim 1, wherein the isolation barrier comprises at least one capacitor.

3. The system of claim 2, wherein the power transmitted across the isolation barrier is transmitted through at least one capacitor of the isolation barrier.

4. The system of claim 3, wherein the caller ID circuitry receives all power from across the isolation barrier.

5. The system of claim 1, the line-side line isolation integrated circuit further comprising:
    ringer detection circuitry integrated within the phone line side circuitry, the ringer detection circuitry including ringer circuitry inputs; and
    caller ID circuitry integrated within the phone line side circuitry, the caller ID circuitry including caller ID circuitry inputs, the ringer circuitry inputs and the caller ID circuitry inputs coupled together.

6. The system of claim 5, further comprising an attenuating interface connected between the phone lines and the ringer detection circuitry, outputs of the interface coupled to both the ringer circuitry inputs and the caller ID circuitry inputs.

7. The system of claim 6, the attenuating interface capacitively coupling the phone lines to the ringer circuitry inputs and the caller ID circuitry inputs.

8. The system of claim 1, the system-side line-isolation integrated circuit further comprising a communication interface capable of connecting to an external system-side integrated circuit.

9. The system of claim 8, wherein the communication interface is operable as an asynchronous serial interface.

10. The system of claim 1, wherein the system-side line-isolation integrated circuit and the line-side line-isolation integrated circuit provide phone-line direct-access-arrangement functionality.

11. A telephone line isolation system, comprising:
    a line-side line-isolation integrated circuit, the line-side integrated circuit configured to be coupled between a phone line isolation barrier and a phone line;
    a power supply within the line-side line isolation circuit, the power supply configured to be generated from power transmitted across the phone line isolation barrier; and
    a caller ID circuit integrated within the line-side isolation integrated circuit, the caller ID circuit configured to receive caller ID data from the phone line and to be powered by the power supply, the caller ID circuitry comprising analog-to-digital converter circuitry configured to output digital data representative of caller ID information.

12. The system of claim 11, further comprising:
    a caller ID circuitry input;
    a ring detection circuitry input; and
    a common line-side line-isolation integrated circuit input node coupled to both the caller ID circuitry input and the ring detection circuitry input, the inputs configured to receive an common attenuated signal representative of data on TIP and RING phone lines.

13. The system of claim 12, further comprising a capacitive interface coupled between the integrated circuit input node and the TIP and RING phone lines.

14. The system of claim 11, further comprising a capacitive interface coupled between the caller ID circuit and the TIP and RING phone lines.

15. The system of claim 14, wherein the phone line isolation barrier comprises at least one capacitor and the power transmitted across the phone line isolation barrier is transmitted through at least one capacitor of the phone line isolation barrier.

16. The system of claim 11, wherein the phone line isolation barrier comprises at least one capacitor.

17. The system of claim 15, wherein the power transmitted across the phone line isolation barrier is transmitted through at least one capacitor of the phone line isolation barrier.

18. The system of claim 11, wherein a signal transmitted across the phone line isolation barrier is utilized to provide power for the power supply.

19. A method for combining line-isolation and modem data processing, comprising:
    providing a phone line isolation barrier comprised of at least one capacitor;
    providing a system-side line-isolation integrated circuit capable of transmitting digital data across the isolation barrier and capable of receiving digital data across the isolation barrier;
    providing a line-side line-isolation integrated circuit capable of transmitting digital data across the isolation barrier and capable of receiving digital data across the isolation barrier;

providing a caller ID circuit within the line-side line-isolation integrated circuit, the caller ID circuit being powered by power transmitted across the isolation barrier, and the caller ID circuitry comprising analog-to-digital converter circuitry configured to output digital data representative of caller ID information;

communicating digital information between the line-side line-isolation integrated circuit and the system-side line-isolation integrated circuit through the isolation barrier, the digital information from the line-side line-isolation integrated circuit being configured to include the digital data representative of caller ID information;

processing the digital data transmitted or received across the isolation barrier with a digital processor within the system-side line-isolation integrated circuit; and also processing the digital data transmitted or received across the isolation barrier with a modem processor within the system-side line-isolation integrated circuit.

20. The method of claim 19, wherein the system-side line-isolation integrated circuit communicates with external circuitry across an asynchronous serial interface.

21. The method of claim 19, further comprising coupling the caller ID circuit to the phone line through a capacitive interface.

22. The method of claim 19, further comprising coupling the caller ID circuit to the phone line through a resistive interface.

23. The method of claim 19, further comprising providing a common input within the line-side line-isolation integrated circuit, the common input coupling the caller ID circuitry to the phone line and coupling ring detection circuitry to the phone line.

24. A method of operating a line-side integrated circuit, the line-side integrated circuit capable of coupling a phone line to phone line isolation barrier, the phone line isolation barrier having at least one isolation capacitor, the method comprising:

providing a caller ID circuit within the line-side line-isolation integrated circuit, the caller ID circuitry comprising analog-to-digital converter circuitry configured to output digital data representative of caller ID information; and powering the caller ID circuit with a power supply generated from power transmitted across the at least one isolation capacitor.

25. The method of claim 24, further comprising coupling the caller ID circuit to the phone line through a capacitive interface.

26. The method of claim 24, further comprising coupling the caller ID circuit to the phone line through a resistive interface.

27. The method of claim 24, further comprising providing a common input within the line-side line-isolation integrated circuit, the common input coupling the caller ID circuitry to the phone line and coupling ring detection circuitry to the phone line.

28. The method of claim 24, wherein the powering step comprises utilizing a signal transmitted across the phone line isolation barrier to provide power for the power supply.

* * * * *